United States Patent
Erikson et al.

(10) Patent No.: US 11,628,739 B2
(45) Date of Patent: *Apr. 18, 2023

(54) ELECTRIC VEHICLE FLEET CHARGING SYSTEM AND METHOD

(71) Applicant: Rivian IP Holdings, LLC, Plymouth, MI (US)

(72) Inventors: Tyler Erikson, Torrance, CA (US); Silva Hiti, Redondo Beach, CA (US); Kyle Underhill, Los Angeles, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 417 days.

This patent is subject to a terminal disclaimer.

(21) Appl. No.: 16/870,889

(22) Filed: May 8, 2020

(65) Prior Publication Data

US 2021/0347280 A1    Nov. 11, 2021

(51) Int. Cl.
| | |
|---|---|
| *B60L 53/67* | (2019.01) |
| *B60L 53/30* | (2019.01) |
| *B60L 53/31* | (2019.01) |
| *B60L 53/66* | (2019.01) |
| *B60L 53/68* | (2019.01) |
| *B60L 53/14* | (2019.01) |

(52) U.S. Cl.
CPC ............... *B60L 53/67* (2019.02); *B60L 53/14* (2019.02); *B60L 53/305* (2019.02); *B60L 53/31* (2019.02); *B60L 53/66* (2019.02); *B60L 53/68* (2019.02)

(58) Field of Classification Search
CPC ....................................................... B60L 53/67
USPC ....................................................... 320/109
See application file for complete search history.

(56) References Cited

U.S. PATENT DOCUMENTS

| | | |
|---|---|---|
| 8,981,718 B2 | 3/2015 | Caffy |
| 9,112,382 B2 | 8/2015 | Paul et al. |
| (Continued) | | |

FOREIGN PATENT DOCUMENTS

| | | |
|---|---|---|
| EP | 3560749 B1 | 7/2021 |
| WO | 2018137542 A1 | 2/2018 |
| WO | 2019106114 A1 | 6/2019 |

OTHER PUBLICATIONS

Sep. 17, 2021 European Search Report issued in International Application No. 21171006.

*Primary Examiner* — Jerry D Robbins
(74) *Attorney, Agent, or Firm* — Clements Bernard Walker; Christopher L. Bernard

(57) ABSTRACT

A charging system includes a plurality of power charging cabinets, each power charging cabinet being configured with a plurality of electrical power outputs. The charging system also includes at least one power dispenser chain coupled to at least one of the plurality of electrical power outputs, each of the power dispenser chains having more than one addressable power dispenser electrically coupled thereto and each of the power dispensers being configured to be addressed based on a vehicle identifier of a vehicle coupled to an addressed power dispenser, each of the power dispensers also having a controller configured to control electrical power delivery to a destination chosen from a charging power output of the power dispenser and to another power dispenser in the power dispenser chain. The charging system further includes a central control system configured to communicate with controllers of the power dispensers of the at least one power dispenser chain.

20 Claims, 12 Drawing Sheets

FIG.1A

(56) References Cited

U.S. PATENT DOCUMENTS

| | | | |
|---|---|---|---|
| 2011/0007824 A1 | 1/2011 | Bridges et al. | |
| 2011/0285345 A1* | 11/2011 | Kawai | B60L 53/11 |
| | | | 320/107 |
| 2011/0291616 A1 | 12/2011 | Kim et al. | |
| 2013/0110296 A1* | 5/2013 | Khoo | G06Q 20/102 |
| | | | 700/286 |
| 2013/0151293 A1* | 6/2013 | Karner | B60L 53/51 |
| | | | 705/5 |
| 2014/0210408 A1 | 7/2014 | Chang et al. | |
| 2014/0379209 A1 | 12/2014 | Matsuda | |
| 2015/0367740 A1 | 12/2015 | McGrath et al. | |
| 2017/0246961 A1 | 8/2017 | Lee et al. | |
| 2017/0274792 A1 | 9/2017 | Vaughan et al. | |
| 2017/0346327 A1* | 11/2017 | Chen | H02J 7/0045 |
| 2018/0001781 A1 | 1/2018 | Quattrini et al. | |
| 2019/0389315 A1 | 12/2019 | Zhu | |
| 2020/0376969 A1* | 12/2020 | Shorten | B60L 53/60 |
| 2021/0028641 A1 | 1/2021 | Ilic et al. | |

* cited by examiner

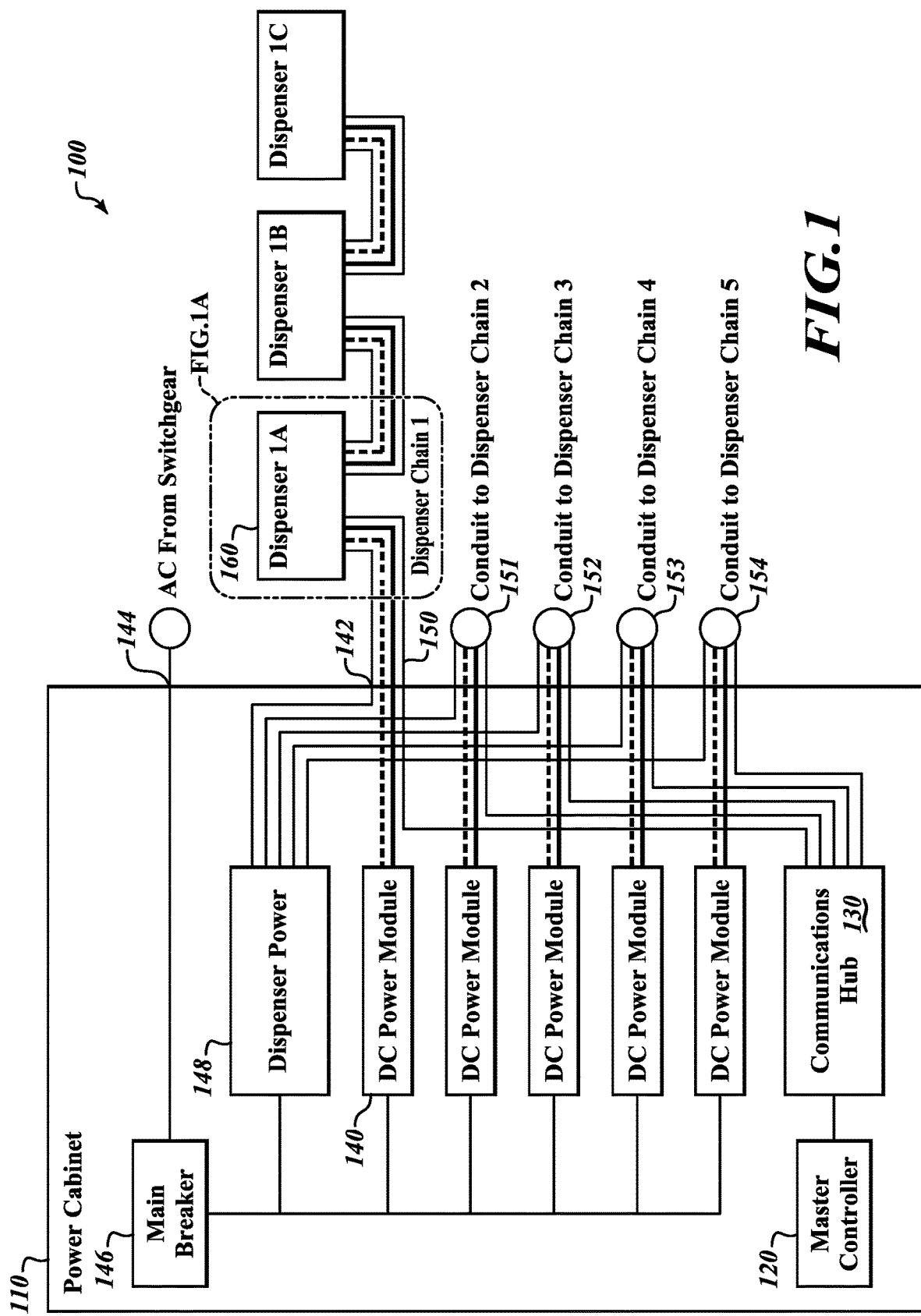

ELECTRIC VEHICLE FLEET CHARGING SYSTEM AND METHOD

INTRODUCTION

The present disclosure relates to charging of electrical vehicles. The statements in this section merely provide background information related to the present disclosure and may not constitute prior art.

With widespread use of electric vehicles comes greater need for charging resources and standardization. Electric Vehicle Supply Equipment (EVSE) is one standard used for vehicle charging equipment. A standard EVSE power cabinet is limited in the number of dispensers it can connect to. Limitations can include the number of power modules in the cabinet, the required power output of the dispensers, or the power cabinet size.

Because of the lack of dispensers for a each power cabinet, the required size of each power cabinet, and the space needed for supply line conduits running to each cabinet, it is challenging to provide a large number of dispensers in a parking area or a parking structure where many vehicles may be simultaneously present. Further, it is also challenging to provide a large number of dispensers to a fleet of electric vehicles that may all require charging during off hours (for example, overnight).

BRIEF SUMMARY

Various disclosed embodiments include illustrative charging systems, electrical dispensers, dispenser chains, methods of charging a vehicle, and methods of providing charging power to a vehicle.

In an illustrative embodiment, a charging system includes a power cabinet having at least one direct current (DC) power module. The charging system also includes at least one dispenser chain, each dispenser chain being electrically couplable to a respective DC power module. Each dispenser chain includes dispensers that are electrically couplable with each other in series and that are configured to dispense electrical power, each of the dispensers being controllable such that electrical power is dispensable by only one dispenser in its dispenser chain at a time.

In another illustrative embodiment, a charging system includes an electric vehicle supply equipment (EVSE) charging station including: an alternating current (AC) power input, at least one direct current (DC) power module coupled to the AC power input, a master controller; a communications hub, at least one output having a DC vehicle power output, a communications output, and a DC dispenser power output. The system also includes at least one dispenser chain. Each dispenser chain may be electrically couplable to a respective DC power module, each dispenser chain including dispensers that are electrically couplable with each other in series and that are configured to dispense electrical power, each of the dispensers being controllable such that electrical power is dispensable by only one dispenser in its dispenser chain at a time, each of the dispensers including a controller, a power outlet, and a switch controlled by the controller, the controller and switch being configured to determine which of the dispensers in the dispenser chain are configured to provide power to the respective power outlet.

In another illustrative embodiment, a method of charging a vehicle includes receiving alternating current (AC) electrical power by an electric vehicle charging station. The method also includes converting AC electrical power to direct current (DC) electrical power by the charging station and outputting at least a portion of the DC electrical power; Further, the method includes receiving the at least a portion of the DC electrical power by a chain of dispensers and outputting the at least a portion of the DC electrical power from only one of the dispensers in the chain of dispensers.

In an illustrative embodiment, a charging station includes an alternating current (AC) electrical power input and at least one direct current (DC) electrical power module coupled to the AC electrical power input. The charging station also includes at least one station output having a vehicle DC electrical power output, a communications output, and a dispenser DC electrical power output, the dispenser DC electrical power output being configured to be coupled to at least one dispenser. The charging station further includes a communications hub including at least one communications network connection, the communications hub being configured to receive information relating to an amount of DC electrical power to be delivered to a particular dispenser coupled to the charging station. Further still, the charging station includes a master controller configured to receive the information from the communications hub relating to the amount of DC electrical power to be delivered to the particular dispenser coupled to the charging station and provide a control signal to one of the at least one DC electrical power modules, the control signal being based on the information and being configured to control the amount of DC electrical power sent through one of the at least one DC electrical power modules.

In another illustrative embodiment, a charging station includes an alternating current (AC) power input and at least one direct current (DC) power module coupled to the AC power input. The charging station also includes at least one station output having a DC vehicle power output, a communications output and a DC dispenser power output, the DC dispenser power output being configured to be coupled to a dispenser chain made up more than one dispenser. The charging station further includes a communications hub including at least one communications network connection, the communications hub being configured to receive information relating to an amount of electrical power to be delivered to a particular dispenser of the dispenser chain coupled to the charging station. Further still, the charging station includes a master controller configured to receive the information from the communications hub relating to the amount of DC electrical power to be delivered to the particular dispenser of the dispenser chain coupled to the charging station and being configured to provide a control signal to one of the plurality of DC power modules, the control signal based on the information and the control signal controlling the amount of DC electrical power sent through one of the plurality of DC power modules.

In another illustrative embodiment, a method of charging a vehicle includes receiving alternating current (AC) electrical power by an electric vehicle charging station and converting the AC electrical power to DC electrical power by a DC power module. The method also includes receiving information by a communication hub relating to an amount of DC electrical power to be delivered to a particular dispenser of a chain of more than one dispenser and sending the information to a master controller. The method further includes sending, by the master controller, a control signal to the DC power module to output power based on the information and sending, by the master controller, a control signal to the chain of more than one dispenser to output power to the particular dispenser of the chain of more than one dispenser. Further still, the method includes outputting at least a portion of the DC electrical power to the particular dispenser of the chain of more than one dispenser.

In an illustrative embodiment, a charging dispenser includes a direct current (DC) electrical power input, a DC electrical power pass through output, and a DC electrical power charging output. The charging dispenser also includes a switching unit coupled to the DC electrical power input, the DC electrical power pass through output, and the DC electrical power charging output. Further, the charging dispenser includes a controller configured to provide control signals to the switching unit, the switching unit being configured, responsive to the control signals, to selectively electrically disconnect the DC electrical power input from the DC electrical power pass through output and electrically connect the DC electrical power input to the DC electrical power charging output of the charging dispenser and to selectively electrically connect the DC electrical power input to the DC electrical power pass through output and electrically disconnect the DC electrical power input from the DC electrical power charging output of the charging dispenser.

In another illustrative embodiment, a charging dispenser includes a dispenser input including a direct current (DC) electrical power input, a control signal input, and a controller power input. The charging dispenser also includes a DC electrical power pass through power output and a dispenser DC electrical power output. Further, the charging dispenser includes a switching unit coupled to the (DC) power input, the DC electrical power pass through output, and the dispenser DC electrical power output. Further still, the charging dispenser includes a controller coupled to the control signal input and coupled to the controller power input, the controller configured to receive control signals from the control signal input from a master controller of a charging power cabinet. The dispenser DC electrical power output is configured to connect with a DC electrical power input of another charging dispenser.

In another illustrative embodiment, a method of providing charging power to a vehicle includes receiving, by a controller, control signals from a master controller of a charging power cabinet and supplying direct current (DC) electrical power to a DC electrical power input of a charging dispenser. The method also includes responsive to the control signals, electrically disconnecting the DC electrical power input of the charging dispenser from a DC electrical power pass through output of the charging dispenser and responsive to the control signals, electrically connecting the DC electrical power input of the charging dispenser to a DC electrical power charging output of the charging dispenser and providing DC electrical power to the vehicle through the DC electrical power charging output.

In an illustrative embodiment, a charging system includes a plurality of power charging cabinets, each power charging cabinet being configured with a plurality of electrical power outputs. The charging system also includes at least one power dispenser chain coupled to at least one of the plurality of electrical power outputs, each of the power dispenser chains having more than one addressable power dispenser electrically coupled thereto and each of the power dispensers being configured to be addressed based on a vehicle identifier of a vehicle coupled to an addressed power dispenser, each of the power dispensers also having a controller configured to control electrical power delivery to a destination chosen from a charging power output of the power dispenser and to another power dispenser in the power dispenser chain. The scharging system further includes a central control system configured to communicate with controllers of the power dispensers of the at least one power dispenser chain.

In another illustrative embodiment, a charging system includes a plurality of power charging cabinet, each power charging cabinet configured with a plurality of electrical power outputs. The charging system also includes a power dispenser chain coupled to one of the plurality of power outputs, the power dispenser chain having at least a first power dispenser and a second power dispenser each of the power dispensers configured to be addressed based on a vehicle identifier of a vehicle coupled to the first power dispenser or the second power dispenser, the first power dispenser coupled to the second power dispenser, the first power dispenser receiving power from the electrical power output of the power charging cabinet and the second power dispenser selectively receiving power from the first power dispenser based on the state of a first switching unit associated with the first power dispenser. Further, the charging system includes a central control system communicating with a first controller of the first power dispenser and with a second controller of the second power dispenser.

In another illustrative embodiment, a method of providing charging power to a vehicle includes receiving, by a first controller of a first power dispenser and a second controller of a second power dispenser, control signals from a master controller a first control signal to charge a first vehicle coupled to a first power dispenser DC electrical power output of a first power dispenser and supplying power to a direct current (DC) electrical power input of the first power dispenser. Responsive to the control signals, the method includes opening a switch from the DC electrical power input of the first power dispenser to a pass-through DC electrical power output of the first power dispenser. Responsive to the control signals, the method also includes closing a switch from the DC electrical power input of the first power dispenser to a first dispenser DC electrical power output. Further, the method includes providing DC electrical power to the vehicle through the first dispenser DC electrical power output.

In an illustrative embodiment, a system includes a computer processor configured to receive a vehicle identifier and a charging power dispenser identifier from a vehicle coupled to a specific charging power dispenser of a charging power dispenser chain. The system also includes a control program being configured to run on the computer processor, the control program being configured to determine a time to deliver power to the vehicle and an amount of power to deliver to the vehicle, the control program being further configured to send to a communication hub of a power cabinet electrically coupled to the charging power dispenser chain the time to deliver power to the vehicle, the amount of power to deliver to the vehicle, the vehicle identifier, and the charging power dispenser identifier.

In another illustrative embodiment, a system includes a system. The system includes a computer processor configured to receive a vehicle identifier and a charging power dispenser identifier from a vehicle coupled to a specific charging power dispenser of a charging power dispenser chain, the computer processor being configured to communicate with a communication hub of a power cabinet. The system also includes a control program being configured to run on the computer processor, the control program being configured to determine a time to deliver electrical power to the vehicle and an amount of electrical power to deliver to the vehicle, the control program being further configured to send to the communication hub the time to deliver electrical power to the vehicle, the amount of time to deliver electrical power to the vehicle, the vehicle identifier, and the charging power dispenser identifier.

In another illustrative embodiment, a vehicle includes a method. The method includes receiving, by a computer processor, a vehicle identifier and a charging power dispenser identifier indicating that a specific vehicle is coupled to a specific charging power dispenser of a charging power dispenser chain. The method also includes determining, by the computer processor, a time to deliver electrical power to the vehicle and an amount of electrical power to deliver to the vehicle; and sending the time to deliver electrical power to the vehicle, the amount of electrical power to deliver or the amount of time to deliver electric power to the vehicle, the vehicle identifier, and the charging power dispenser identifier, to a communication hub of a power cabinet coupled to the charging power dispenser chain.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

FIG. 1 is a block diagram of an illustrative power cabinet coupled to electrical power dispenser chains.

Like reference symbols in the various drawings generally indicate like elements.

DETAILED DESCRIPTION

Figure 1A:
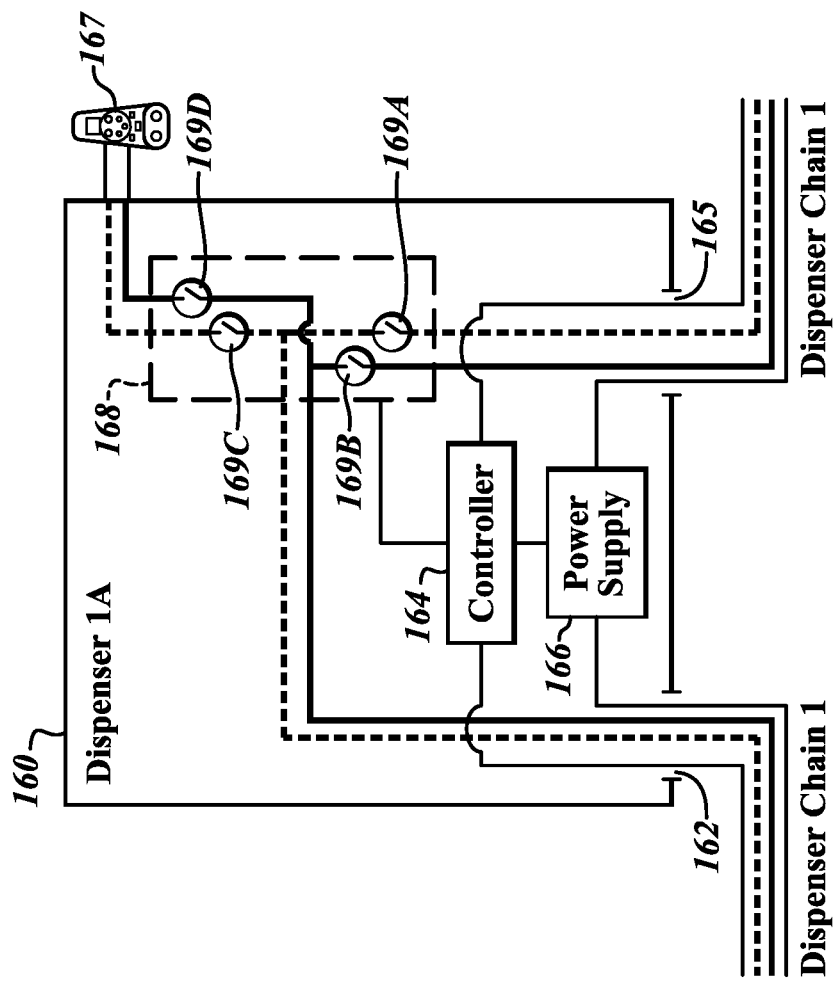
FIG. 1A is a schematic diagram of an illustrative electrical power dispenser of FIG. 1.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative charging systems, electrical dispensers, dispenser chains, methods of charging a vehicle, and methods of providing charging power to a vehicle.

It will be appreciated that various disclosed charging systems, equipment, and methods may be suited for charging large numbers of vehicles such as but not limited to fleet vehicles. For example, it may be beneficial to have a fleet of delivery trucks that all charge during overnight hours, to be deployed during the day for deliveries. In such a case the disclosed systems provide for reducing the required number of charging power cabinets thereby saving both cost and space within the refueling (recharging) structure. Similarly, such systems may be applied in parking garages where people work or at entertainment or shopping venues where a large number of vehicles may need charging during a period that the vehicles are not being used.

Referring now to FIG. 1, an illustrative charging system 100 is depicted. The charging system 100 includes a power cabinet 110 having a master controller 120 that is coupled to a communications hub 130. At least one direct current (DC) power module 140 converts alternating current (AC) electrical power from an AC electrical power input 144 which passes through a main breaker 146 before being sent to power modules 140 and a dispenser power module 148 which provides working power to the dispenser electronics. Typically, an Electric Vehicle Service Equipment (EVSE) power cabinet includes up to five (5) DC power modules 140. Each power module 140 is coupled to a single electric power dispenser 160 for providing electrical power to a single vehicle. The master controller 120 is configured to control the power output of each of the DC power modules 140. The power cabinet 110 may be but is not limited to an EVSE power cabinet.

A power cabinet that uses isolated power modules that combine to achieve peak power outputs in excess of 300 kW has the capability to charge over 20 vehicles in an overnight dwell scenario. While currently-known power cabinets cannot connect with more than 5 dispensers, thereby leaving unused capacity that reduces charging site economics, in various embodiments, illustrative hardware and software aspects of the dispenser 160 can help allow more dispensers 160 to connect to the power cabinet 110 at a power cabinet output 150. The dispenser 160 may be configured to connect to the power cabinet 110 in a normal manner, but also includes a mechanism to pass the power and communication to another dispenser (for example, from Dispenser 1A to Dispenser 1B as depicted in FIG. 1). The dispenser 160 can thus act as a pass-through connection for additional dispensers back to the power cabinet 110.

Given that the illustrative power cabinet 110 as shown has five (5) output conduits 150, 151, 152, 153, and 154, each of those five (5) output conduits, which typically each connect to a single dispenser, are each connected to a chain of dispensers 160 (for example 1A, 1B, 1C). For each dispenser chain, such as dispenser chain 1, only one dispenser 160 can charge a vehicle at a time. However, the chain, with added electronic control, allows for many vehicles to be plugged in at the end of a shift and the power cabinet 110 master control 120 cycles charging through the dispensers 160 in the chain 1.

It will be appreciated that each dispenser chain is not limited to three (3) dispensers 160 as depicted in FIG. 1. Rather, any number of dispensers 160 may be used on the dispenser chain subject to DC voltage drop and other electrical, physical, and operational limitations which can help to determine optimum number of dispensers 160 in a chain for the application.

In various embodiments, the power cabinet 110 may be connected to one or more dispenser chains by a conduit such as the conduit 150 that connects the Dispenser Chain 1 with the DC power module 140. Each dispenser chain includes the dispensers 160 that are electrically couplable with each other in series and that are configured to dispense electrical power. Each of the dispensers are separately controllable such that electrical power is dispensable by only one dispenser 160 in its dispenser chain at a time.

Referring now to FIG. 1A, an illustrative single dispenser 160 of the dispenser chain 1 of FIG. 1 is depicted. The dispenser 160 includes a conduit input 162, a controller 164, a conduit output 165, a power supply 166, an electrical power outlet 167, and a switching unit 169. The switching unit 169 includes switches 169A, 169B, 169C, and 169D. The switching unit 169 may be controlled by the controller 164. The controller 164 and the switching unit 169 are configured to determine which of the dispensers 160 in the dispenser chain are configured to provide power to the respective power outlet 167. For example, controller 164 may command switches 169C and 169D to close and switches 169A and 169B to open. In this condition, electrical power flows to the electrical power outlet 167. Alternatively, the controller 164 may command switches 169C and 169D to open and switches 169A and 169B to close. In this condition, Dispenser 1A simply acts as a power pass through and electrical power is passed on to the next dispenser 160 in the dispenser chain Dispenser 1B.

Referring again to FIG. 1, in various embodiments the master controller 140 may be configured to deliver control signals to the controllers 164 of the dispensers 160 of the dispenser chain and thereby control the power output to each of the dispensers. The communications hub 130 may be configured to provide the controllers 164 with signals from the master controller 164. The communications hub 130 may also be configured with a communications network connection which may be wired or wireless. Each of the dispensers 160 in the dispenser chain may be individually addressed by the communications hub 130. Each of the dispensers 160 also have dispenser identifiers associated therewith to facilitate communications between the dispenser controller 164 and the communications hub 130.

Figure 2:
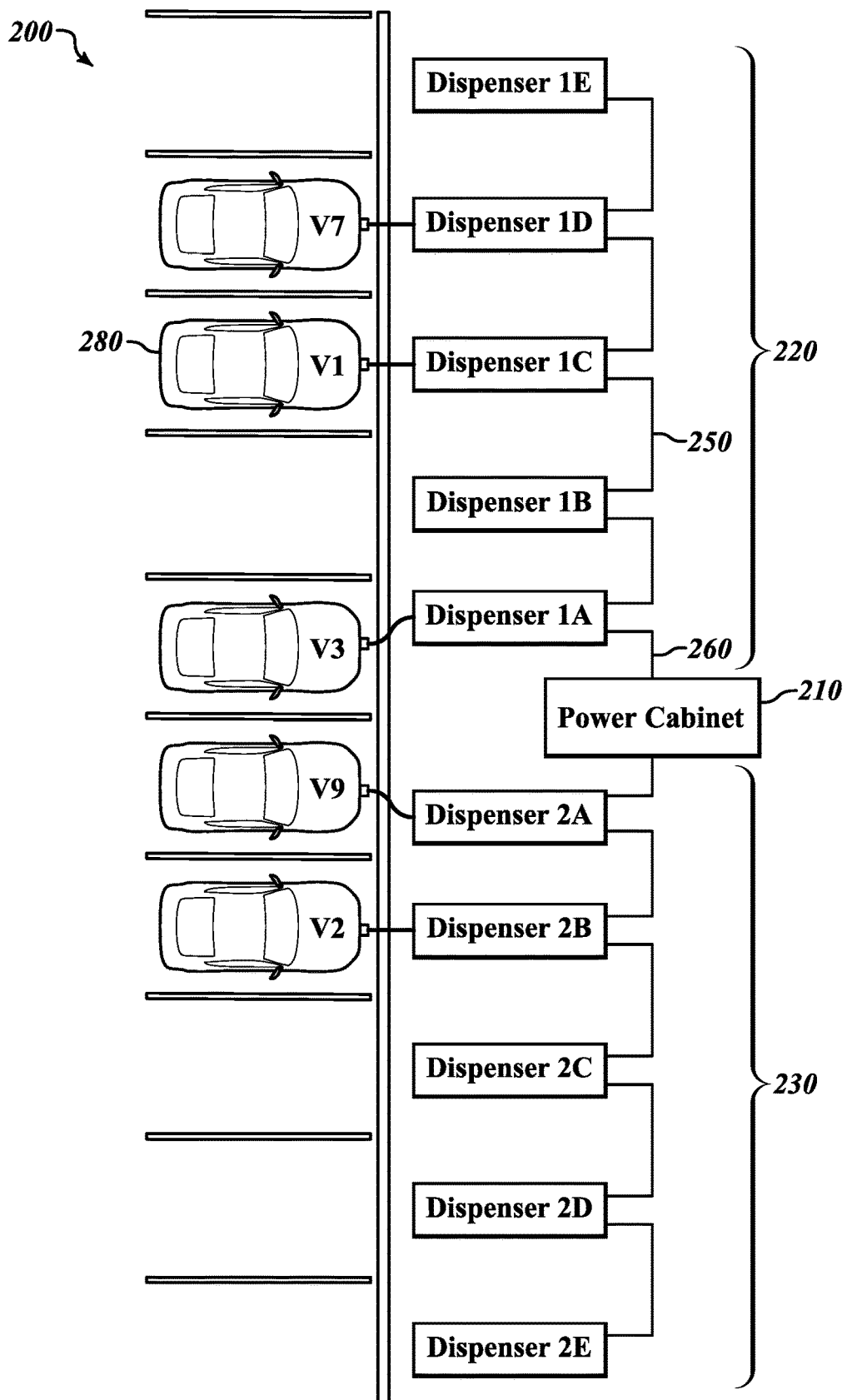
FIG. 2 is a block diagram in partial schematic form of an illustrative dispenser chain arrangement.

Through the communications network, the communications hub 130 may be connected to and communicate with a scheduling server. The scheduling server may be configured to provide information to the communications hub related to scheduling of charging vehicles coupled to the dispensers 160. For example, referring now to FIG. 2 a charging system 200 is depicted. The charging system 200 includes a power cabinet 210. The power cabinet 210 is electrically coupled to two dispenser chains—in this example, dispenser chain 220 and dispenser chain 230. In the example depicted, each of the two dispenser chains 220 and 230 has five (5) dispensers on each chain. The dispenser chain 220 has dispensers 1A, 1B, 1C, 1D, and 1E, and the The dispenser chain 230 has dispensers 2A, 2B, 2C, 2D, and 2E. The dispenser chain 220, for example, receives power through power cabinet output 260. Dispensers in the chain are electrically coupled to each other by a connecting power conduit 250, which is shown connecting dispenser 1B and 1C. Electric vehicles V1, V2, V3, V7, and V9 are electrically coupled to various dispensers in the dispenser chains 220 and 230.

In various embodiments, a scheduling server receives a vehicle identifier and a dispenser identifier so that it knows that the vehicle V1 280 is connected to the Dispenser 1C. The scheduling server determines the charging requirements for the vehicle V1 280, as well as the other vehicles coupled to the dispenser chains, and commands delivery of power to the vehicle V1 280 at a specified time. Further, the scheduling server may be used to determine an amount of power to deliver to the vehicle V1 280 or a time duration to deliver power to the vehicle V1 280.

Figure 3:
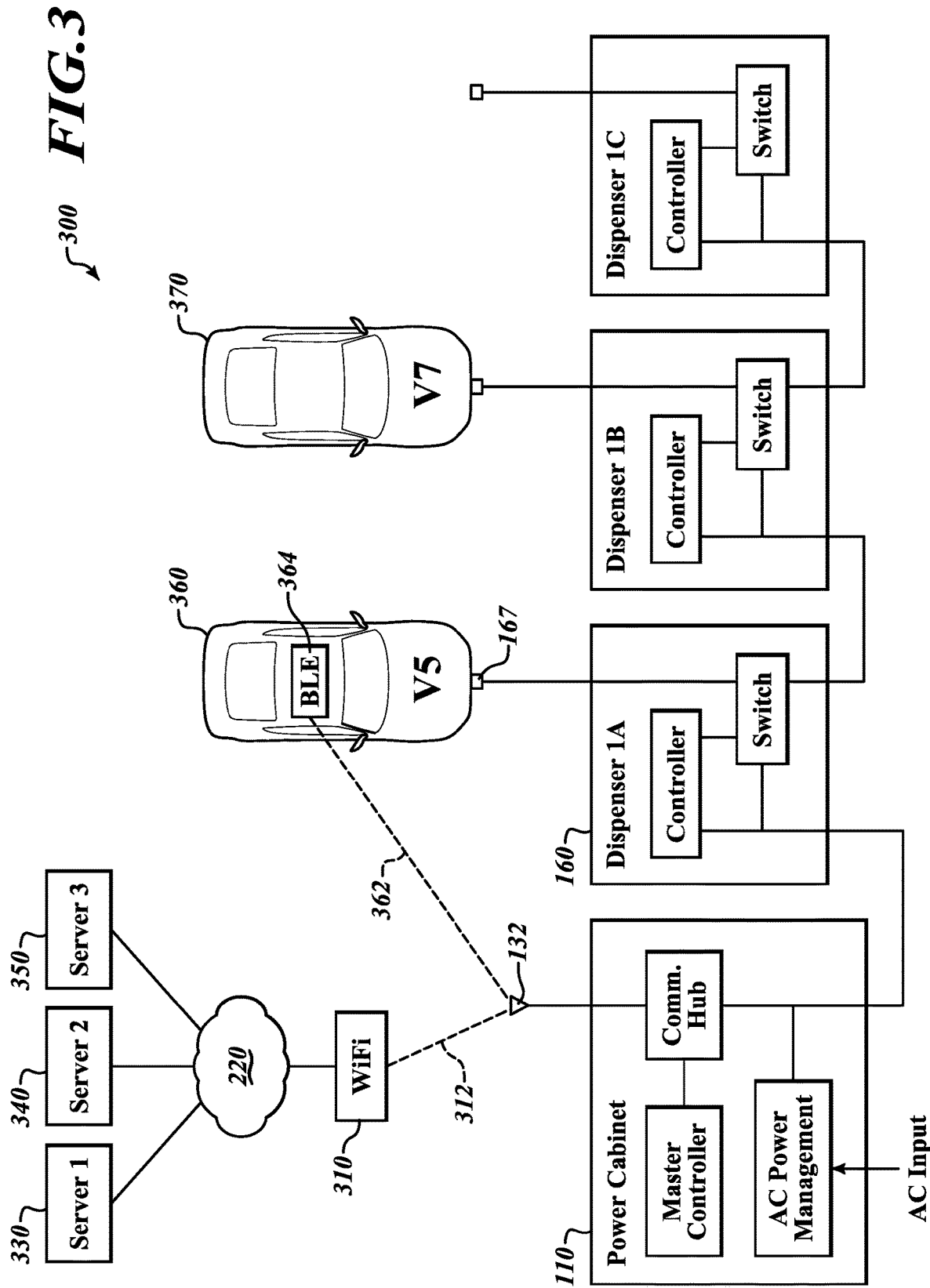
FIG. 3 is a block diagram in partial schematic form of an illustrative vehicle charging system.

Referring now to FIG. 3, an illustrative charging system 300 is depicted. In various embodiments the charging system 300 includes the power cabinet 110 that is coupled to Dispenser Chain 1 having dispensers 160. In the state depicted two vehicles, vehicle V5 360 and vehicle V7 370, are electrically connected to dispensers 1A and 1B respectively via plugs 167. The communications hub of the power cabinet 110 may include a radio frequency antenna 132. The antenna 132 may be configured to send and receive via various communication protocols including but not limited to WiFi, Bluetooth, Bluetooth Low Energy (BLE), and the like. In the example depicted, vehicle V5 includes a BLE transceiver 364 for communicating, with the communications hub, a vehicle identifier and any other information. Further, the communications hub of the power cabinet 110 may also communicate over a WiFi link 312 with a WiFi access point 310 that, in turn, communicates with one or more computer processors or computer servers 330, 340, and 350 over a communications network 220 such as but not limited to the Internet. In various embodiments the Server 1 330 may be, but is not limited to, a scheduling server. The Server 2 340 may be, but is not limited to, a diagnostics server and the Server 3 350 may be, but is not limited to, a billing server. In various embodiments, the diagnostics Server 2 340 may be configured to provide information to the communications hub related to diagnostics of any of the DC power modules, diagnostics of the vehicles (including but not limited to battery diagnostics), and diagnostics of the dispensers. In various embodiments, the billing Server 3 350 may be configured to provide information to the communications hub related to billing for power provided to vehicles from the dispensers. For example, the billing Server 3 350 may create an electronic transaction for electrical power received by the vehicle V5 360 through Dispenser 1A.

In embodiments where the Server 1 330 is configured as a scheduling server, the scheduling server may be configured to schedule charging of vehicles coupled to dispenser chains of a power cabinet such as Dispenser Chain 1 coupled to the power cabinet 110. For example, with multiple vehicles coupled to Dispenser Chain 1, such as vehicle V5 and V7, as depicted, the scheduling server may be configured in any of a variety of ways to schedule a time to deliver electrical power to each of the vehicles at individual times and for individual lengths of times according to various parameters. It should be noted that each of vehicles V5 and V7 will only receive power at separate times because the dispenser chain is configured with software and hardware allowing only one vehicle, on each dispenser chain, to receive power at a time. The scheduling server may determine, for example, that during the next day vehicle V5 will only require 80% of it's battery capacity and the vehicle needs to leave in 12 hours. The scheduling server also determines that it will take 4 hours to provide the needed charge. This and other information related to scheduling may come from the vehicle itself or it may be provided from an outside source that schedules vehicles, for instance in the case of a fleet of vehicles (e.g. delivery vehicles in a fleet of delivery vehicles, buses in a fleet of buses, etc.). The scheduling server may also have information related to scheduling that says vehicle V7 needs 100% battery capacity and needs to leave in 8 hours and that it will take 6 hours to charge it. In this case, the scheduling server will provide charge to vehicle V7 on Dispenser 1B until fully charged and then subsequently charge vehicle V5 on Dispenser 1A until it receives the 80% charge as needed. This scheduling scenario is provided for example only and many other scenarios may be envisioned. Also, other parameters may be used to determine the optimal charging schedule not limited to those used in this example.

In embodiments where the Server 2 340 is configured as a diagnostics server, the diagnostics server may be configured to receive and provide a number of diagnostics signals and diagnostics information. For example, diagnostics information or diagnostics signals may be received from vehicles coupled to dispensers in the dispenser chain—for example, vehicles V5 and V7 on Dispenser Chain 1. The diagnostics information or information related to diagnostics may include but is not limited to battery faults, vehicle maintenance information, reduction in maximum battery condition, other detectable repair needs for the vehicle, and the like. This diagnostics information provides information as to the health of the vehicle or the health of the power cabinet, for example. The diagnostic health may be indicated in any of a variety of ways including simple parameters of whether specific equipment is operational or not or may be more specific as to what problems may be occurring with the equipment. The diagnostics server may also receive diagnostics information and diagnostics signals from the power cabinet 110 and from the power dispensers. For example, these diagnostics signals and information may indicate that the power modules of the power cabinet 110 may have faults or the dispensers may have faults. In these cases, the communications hub may relay that information to vehicles, such as, for example, that specific dispensers should be avoided. Also, such diagnostics information can be used by the scheduling server so that vehicles may be scheduled to avoid specific dispensers or for fleets of vehicles to schedule specific vehicles out of service. This diagnostics information and scenarios are provided for example only and varying information and scenarios may be envisioned.

Referring again to FIG. 3, in various embodiments a system for charging vehicles 300 includes the Server 1 330 which may be a computer having a computer processor that is configured to receive a vehicle identifier and a charging power dispenser identifier from a vehicle coupled to a specific charging power dispenser of a charging power dispenser chain. For example, Server 1 350 may receive a vehicle identifier from vehicle V7 and dispenser identifier corresponding to Dispenser 1B. A control program may be configured to run on the computer processor of Server 1 330. The control program may be configured to determine a time to deliver power to the vehicle and an amount of power to deliver to the vehicle. The control program may further be configured to send to the communications hub of the power cabinet 110, which is electrically coupled to the charging power dispenser chain, the time to deliver power to the vehicle, the amount of power to deliver to the vehicle, the vehicle identifier, and the charging power dispenser identifier.

Referring again to FIG. 1, the charging station 110 may include the alternating current (AC) electrical power input 144 and at least one direct current (DC) electrical power module 140 coupled to the AC electrical power input 144. The at least one station output through the output conduit 150 may include a vehicle DC electrical power output, a communications output, and a dispenser DC electrical power output 142, and the dispenser DC electrical power output may be configured to be coupled to at least one dispenser. The charging station 110 further includes a communications hub 130 with at least one communications network connection, the communications hub 130 being configured to receive information relating to an amount of DC electrical power to be delivered to a particular dispenser coupled to the charging station 110. Further still, charging station 110 may include a master controller 120 configured to receive the information from the communications hub 130 relating to the amount of DC electrical power to be delivered to the particular dispenser 160 coupled to the charging station 110 and provide a control signal to one of the at least one DC electrical power modules. The control signal may be based on the information relating to the amount of DC electrical power to be delivered to the particular dispenser 160 and may be configured to control the amount of DC electrical power sent through one of the at least one DC electrical power modules. In various embodiments, the master controller 120 may be configured to provide a control signal, through the communications output, to more than one dispenser controllers configured to control the power output of each of the dispensers.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Figure 4:
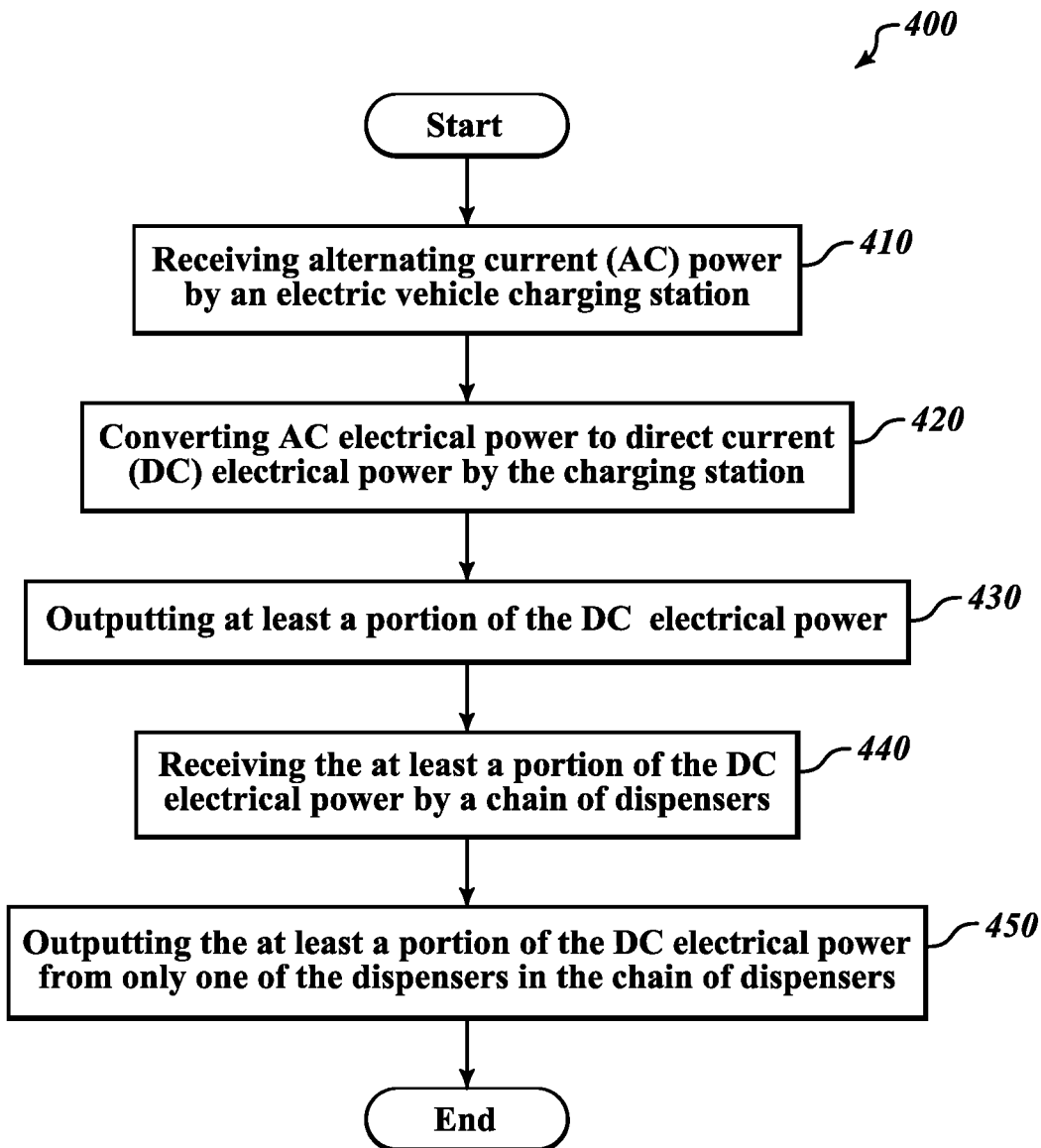
FIG. 4 is a flowchart of an illustrative method of charging a vehicle.

Referring now to FIG. 4, an illustrative method 400 of charging a vehicle is depicted. The method 400 starts at a block 405. At a block 410 the method 400 includes receiving alternating current (AC) electrical power by an electric vehicle charging station. At a block 420, the method 400 includes converting AC electrical power to direct current (DC) electrical power by the charging station. Further, at a block 430 the method 400 includes outputting at least a portion of the DC electrical power from the charging station and at a block 440 receiving the at least a portion of the DC electrical power by a chain of dispensers. Further still, at a block 450 the method 400 includes outputting the at least a portion of the DC electrical power from only one of the dispensers in the chain of dispensers. The method 400 stops at a block 455.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either subcomponent operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 5:
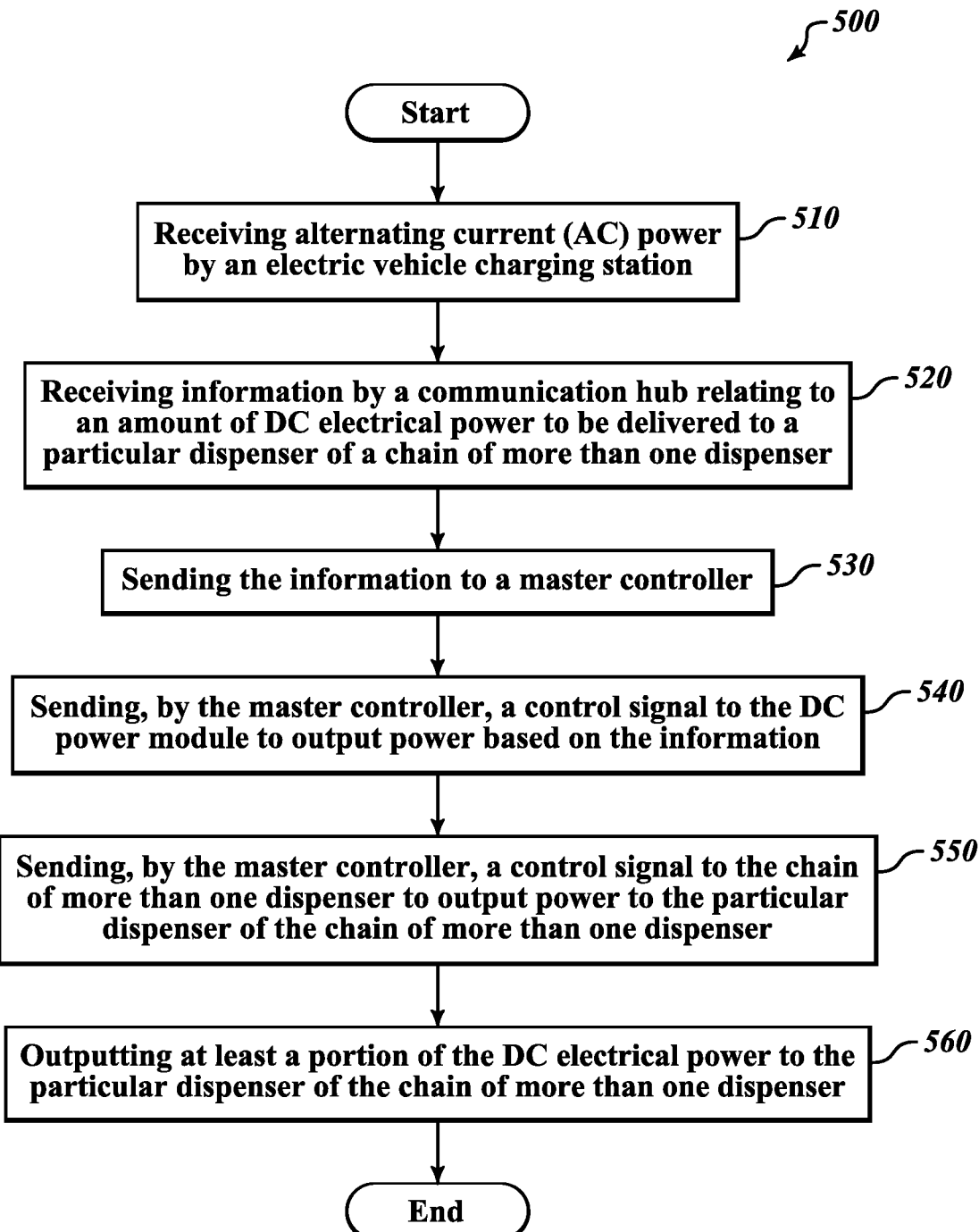
FIG. 5 is a flowchart of another illustrative method of charging a vehicle.

Referring now to FIG. 5, an illustrative method 500 of charging a vehicle is depicted. The method 500 starts at a block 505. At a block 510 the method 500 includes receiving alternating current (AC) electrical power by an electric vehicle charging station. The method 500 also includes at a block 520 receiving information by a communication hub relating to an amount of DC electrical power to be delivered to a particular dispenser of a chain of more than one dispenser and at a block 530 sending the information to a master controller. At a block 540, the master controller may send a control signal to the DC power module to output power based on the information. At a block 550 the master controller may send a control signal to the chain of more than one dispenser to output power to the particular dispenser of the chain of more than one dispenser. Further, the method 500 includes, at a block 560 outputting at least a portion of the DC electrical power to the particular dispenser of the chain of more than one dispenser. The method 500 stops at a block 565.

Figure 6:
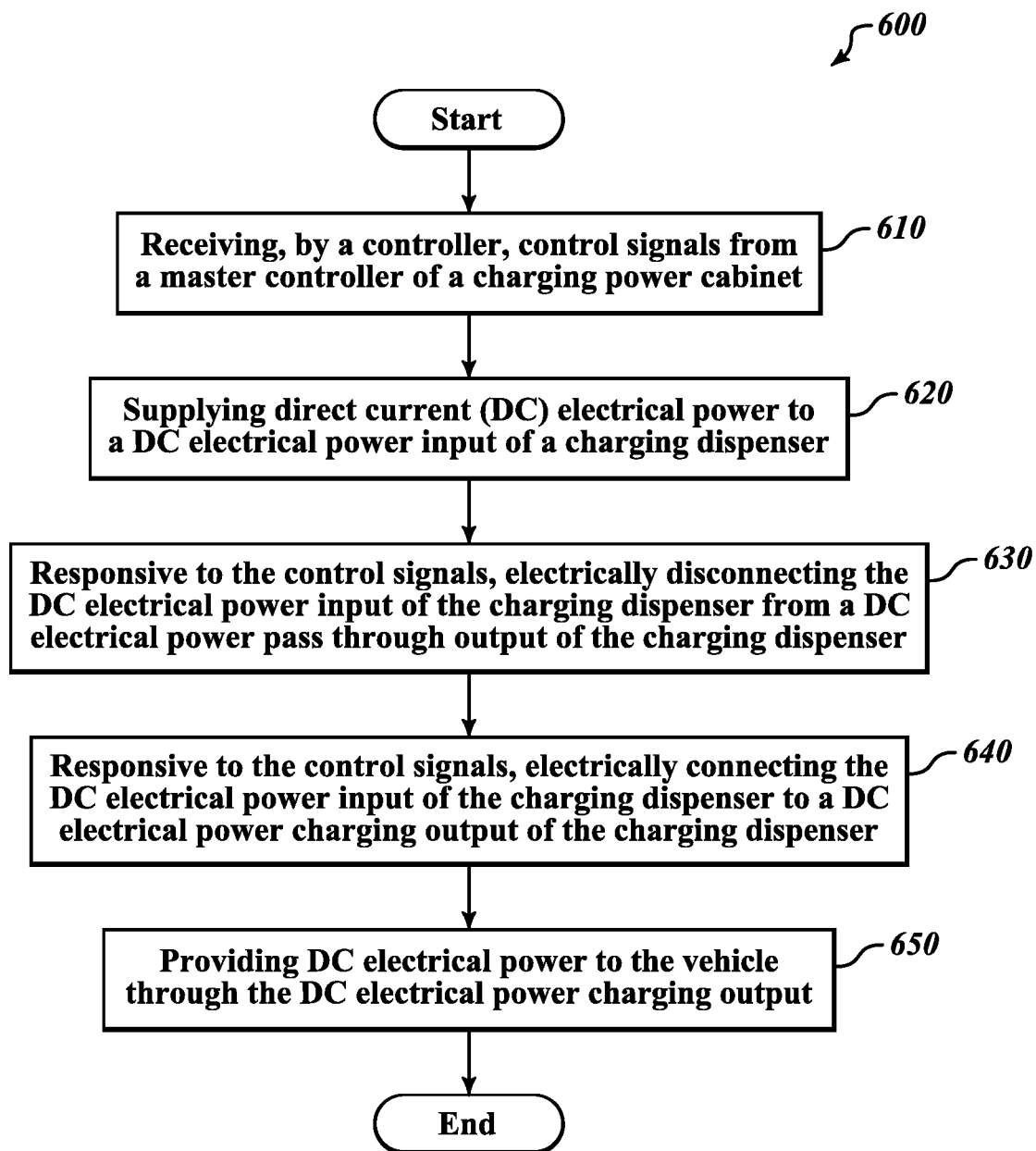
FIG. 6 is a flowchart of an illustrative method of providing charging power to a vehicle.

Referring now to FIG. 6, an illustrative method 600 of providing charging power to a vehicle is depicted. The method 600 starts at a block 605. At a block 610 the method 600 includes receiving, by a controller, control signals from a master controller of a charging power cabinet and at a block 620 supplying DC electrical power to a DC electrical power input of a charging dispenser. At a block 630, responsive to the control signals, the method 600 includes electrically disconnecting the DC electrical power input of the charging dispenser from a DC electrical power pass through output of the charging dispenser. Further, at a block 640, responsive to the control signals, the method 600 includes electrically connecting the DC electrical power input of the charging dispenser to a DC electrical power charging output of the charging dispenser. The method 600 further includes at a block 650 providing DC electrical power to the vehicle through the DC electrical power charging output. The method 600 stops at a block 655.

Figure 7:
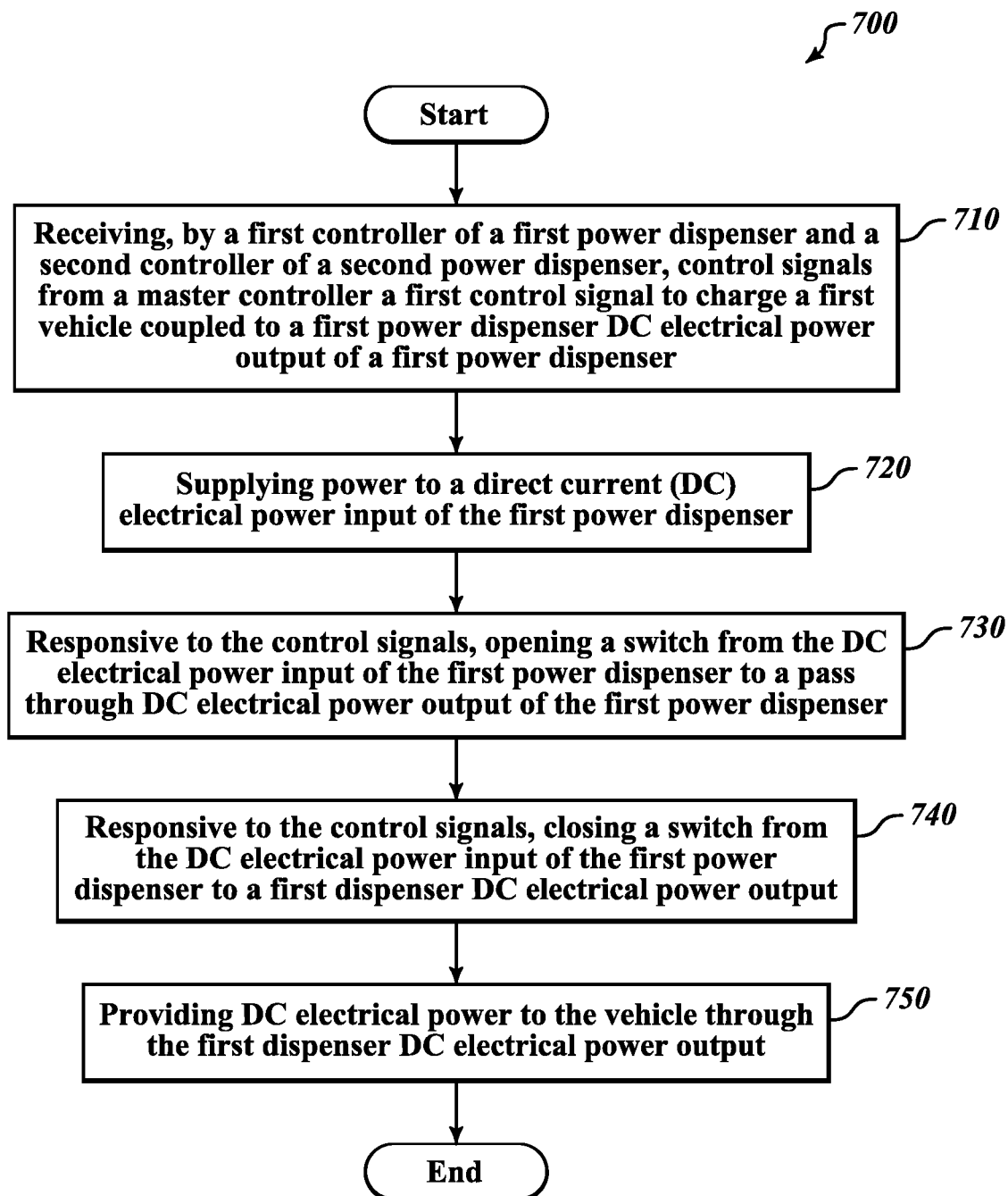
FIG. 7 is a flowchart of another illustrative method of providing charging power to a vehicle.

Referring now to FIG. 7, an illustrative method 700 of providing charging power to a vehicle is depicted. The method 700 starts at a block 705. At a block 710 the method 700 includes receiving, by a first controller of a first power dispenser and a second controller of a second power dispenser, control signals from a master controller a first control signal to charge a first vehicle coupled to a first power dispenser DC electrical power output of a first power dispenser. The method 700 also includes at a block 720 supplying power to a direct current (DC) electrical power input of the first power dispenser and at a block 730 responsive to the control signals, opening a switch from the DC electrical power input of the first power dispenser to a pass through DC electrical power output of the first power dispenser. Further, the method 700 includes responsive to the control signals, at a block 740 closing a switch from the DC electrical power input of the first power dispenser to a first dispenser DC electrical power output. Further, the method 700 includes at a block 750 providing DC electrical power to the vehicle through the first dispenser DC electrical power output. The method 700 stops at a block 755.

Figure 8:
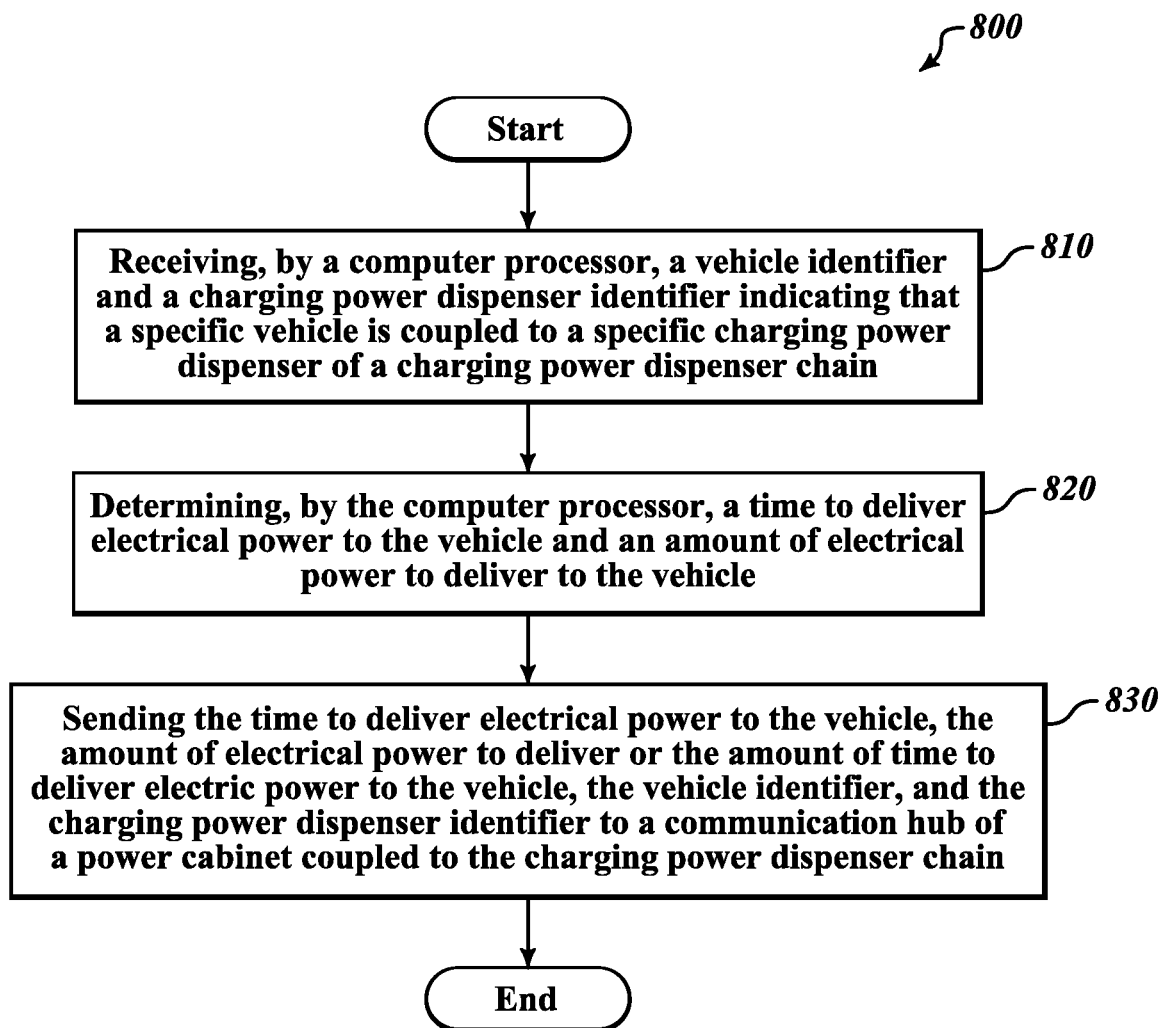
FIG. 8 is a flowchart of another illustrative method of providing charging power to a vehicle.

Referring now to FIG. 8, an illustrative method 800 of providing charging power to a vehicle is depicted. The method 800 starts at a block 805. At a block 810 the method 800 includes receiving, by a computer processor, a vehicle identifier and a charging power dispenser identifier indicating that a specific vehicle is coupled to a specific charging power dispenser of a charging power dispenser chain. The method 800 also may include at a block 820 determining, by the computer processor, a time to deliver electrical power to the vehicle and an amount of electrical power to deliver to the vehicle. Further, the method may include, at a block 830 sending the time to deliver electrical power to the vehicle, the amount of electrical power to deliver or the amount of time to deliver electric power to the vehicle, the vehicle identifier, and the charging power dispenser identifier, to a communication hub of a power cabinet coupled to the charging power dispenser chain. The method 800 stops at a block 835.

Figure 9:
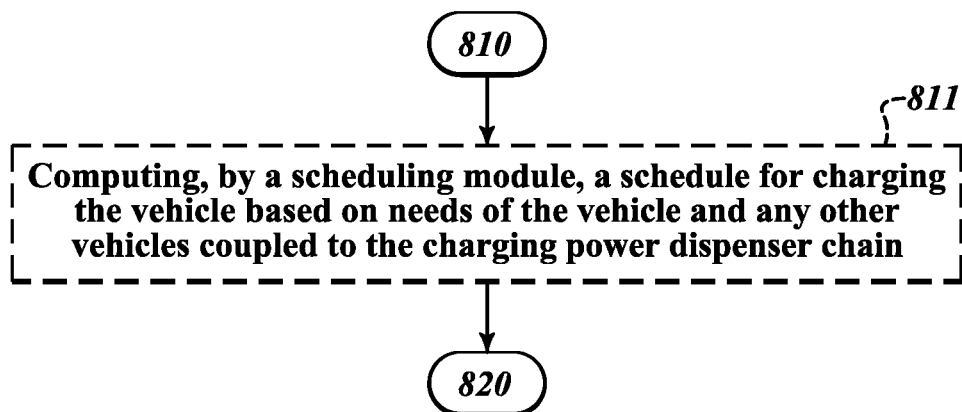
FIGS. 9-16 are flowcharts of illustrative details of the method of FIG. 8.
Figure 10:
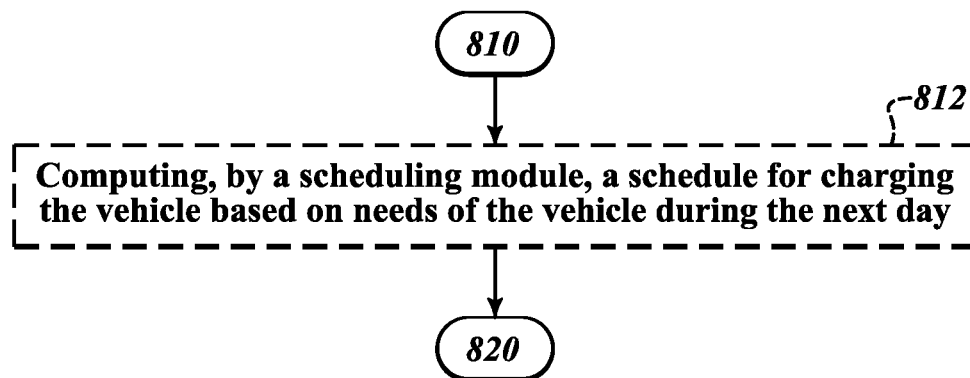
Figure 11:
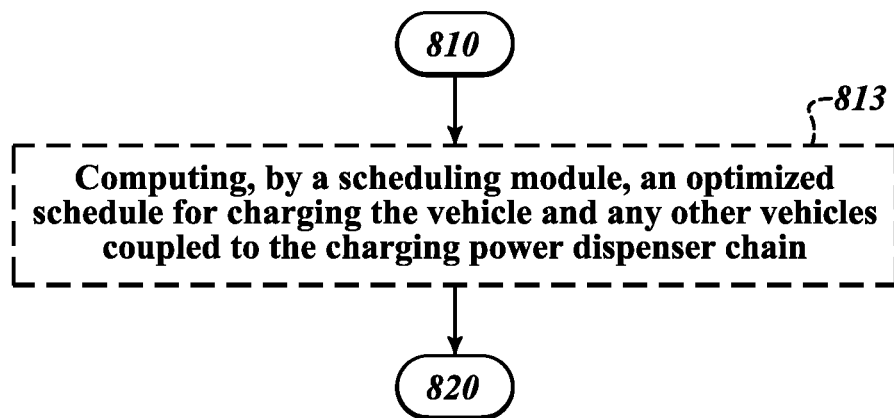
Figure 12:
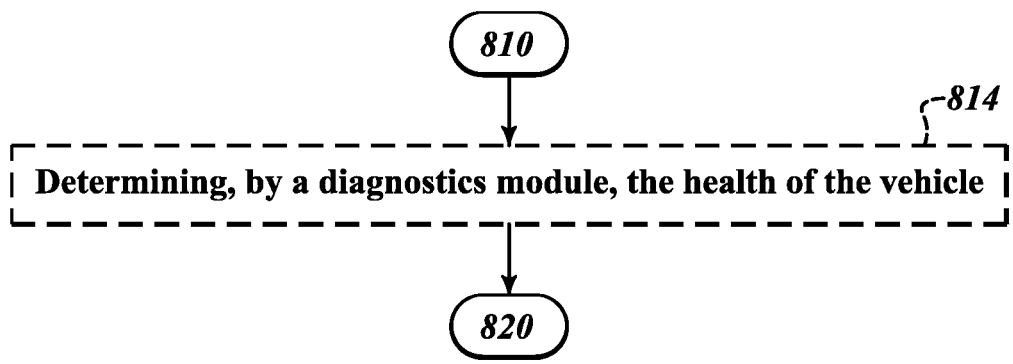
Figure 13:
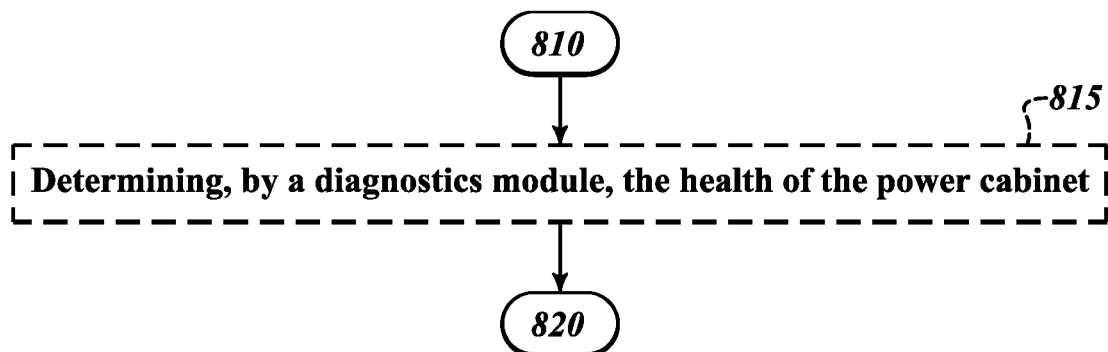
Figure 14:
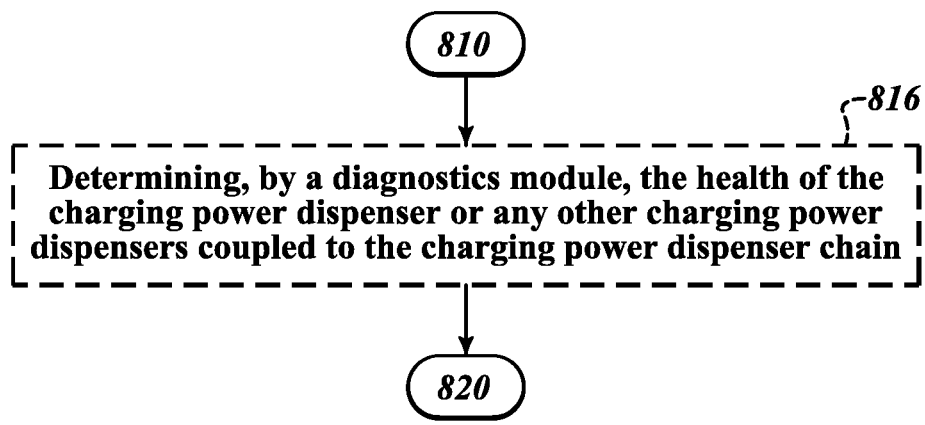
Figure 15:
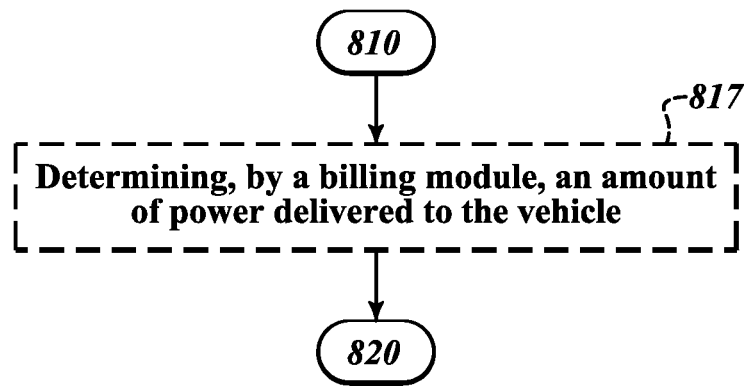
Figure 16:
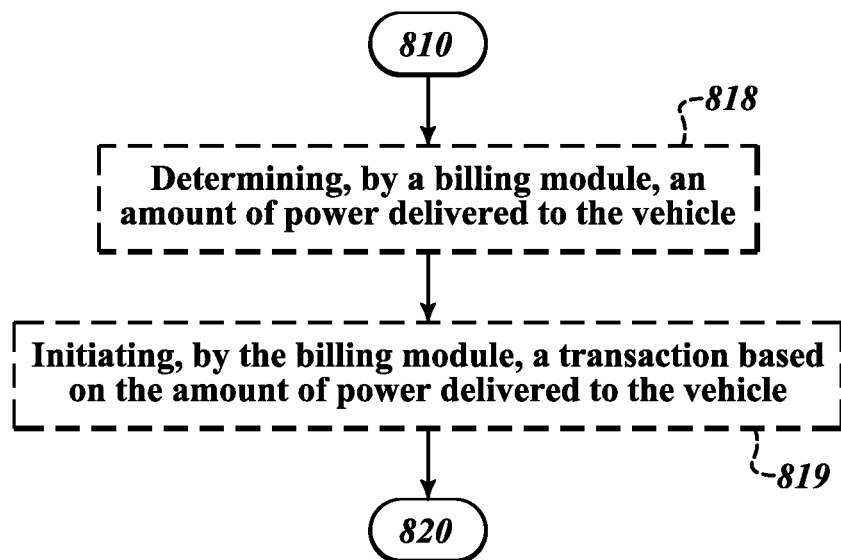

The method 800 may also include, at a block 811 computing, by a scheduling module, a schedule for charging the vehicle based on charging requirements of the specific vehicle and other vehicles coupled to the charging power dispenser chain (see FIG. 9). Further, the method 800 may also include, at a block 812 computing, by a scheduling module, a schedule for charging the vehicle based on charging requirements of the vehicle during the next day (see FIG. 10). Further still, the method 800 may include, at a block 813 computing, by a scheduling module, an optimized schedule for charging the specific vehicle and other vehicles coupled to the charging power dispenser chain (see FIG. 11). Yet further still, the method 800 may include at a block 814 determining, by a diagnostics module, health of the vehicle (see FIG. 12). Yet still further, the method 800 may include, at a block 815, determining, by a diagnostics module, health of the power cabinet (see FIG. 13). Yet still further, the method 800 may include at a block 816 determining, by a diagnostics module, health of the at least one charging power dispenser chosen from the specific charging power dispenser and other charging power dispensers coupled to the charging power dispenser chain (see FIG. 14). Yet still further, the method 800 includes at a block 817 determining, by a billing module, an amount of electrical power delivered to the vehicle (see FIG. 15). Yet still further, the method 800 may include, at a block 818 determining, by the billing module, an amount of power delivered to the vehicle and at a block 819 initiating, by the billing module, a transaction based on the amount of electrical power delivered to the vehicle (see FIG. 16).

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A charging system, comprising:
   a plurality of power charging cabinets, each power charging cabinet being configured with a plurality of electrical power outputs;
   at least one power dispenser chain coupled to at least one of the plurality of electrical power outputs, each of the power dispenser chains having more than one addressable power dispenser electrically coupled thereto and each of the addressable power dispensers being configured to be addressed based on a vehicle identifier of a vehicle coupled to an addressable power dispenser, each of the addressable power dispensers also having a controller configured to control electrical power delivery to a destination chosen from a charging power output of the addressable power dispenser and to a second addressable power dispenser in the power dispenser chain through the addressable power dispenser; and
   a central control system configured to communicate with controllers of the addressable power dispensers of the at least one power dispenser chain.

2. The charging system of claim 1, wherein each of the power charging cabinets includes a communications hub.

3. The charging system of claim 1, wherein each of the power charging cabinets includes a communications hub and the communications hub is configured to communicate with vehicles via a radio frequency link.

4. The charging system of claim 1, wherein each of the power charging cabinets includes a communications hub and the communications hub is configured to communicate with vehicles via a radio frequency link and the radio frequency link includes a Bluetooth link.

5. The charging system of claim 1, wherein each of the power charging cabinets includes a master controller, the master controller being configured to communicate with the controllers of the power dispensers coupled to the power charging cabinets.

6. The charging system of claim 1, wherein each of the power charging cabinets includes a master controller, and a communication hub, the master controller being configured to communicate with the communications hub.

7. The charging system of claim 1, wherein each of the power charging cabinets includes a master controller, and a communication hub, the master controller being configured to communicate with the communication hub and the communication hub being configured to receive vehicle identification information.

8. The charging system of claim 1, wherein each of the power charging cabinets includes a master controller, and a communication hub, the master controller being configured to communicate with the communication hub and the communication hub being configured to receive vehicle identification information relating to a vehicle coupled to a power dispenser and the power dispensers configured to provide power dispenser identification to the communication hub.

9. The charging system of claim 1, wherein each of the power charging cabinets includes a communications hub and the communications hub is configured to communicate with a scheduling server, the scheduling server being configured to schedule charging of the vehicle.

10. The charging system of claim 1, wherein each of the power charging cabinets includes a communications hub and the communications hub is configured to communicate with a diagnostic server, the diagnostic server being configured to identify diagnostics of any of vehicles, power charging cabinets, and power dispensers.

11. A charging system, comprising:
    a plurality of power charging cabinets, each power charging cabinet configured with a plurality of electrical power outputs;
    a power dispenser chain coupled to one of the plurality of power outputs, the power dispenser chain having at least a first power dispenser and a second power dispenser each of the power dispensers configured to be addressed based on a vehicle identifier of a vehicle coupled to the first power dispenser or the second power dispenser, the first power dispenser coupled to the second power dispenser, the first power dispenser receiving power from the electrical power output of the power charging cabinet and the second power dispenser selectively receiving power from the electrical power output of the power charging cabinet through the first power dispenser based on the state of a first switching unit associated with the first power dispenser; and
    a central control system communicating with a first controller of the first power dispenser and with a second controller of the second power dispenser.

12. The charging system of claim 11, wherein each of the plurality of power charging cabinets includes a communications hub.

13. The charging system of claim 11, wherein each of the plurality of power charging cabinets includes a communications hub and the communications hub communicates with vehicles via a radio frequency link.

14. The charging system of claim 11, wherein each of the plurality of power charging cabinets includes a master controller, the master controller being configured to communicate with the first controller and the second controller.

15. The charging system of claim 11, wherein each of the plurality of power charging cabinets includes a master controller, and a communication hub, the master controller being configured to communicate with the communication hub.

16. The charging system of claim 11, wherein each of the plurality of power charging cabinets includes a master controller, and a communication hub, the master controller being configured to communicate with the communication hub and the communication hub being configured to receive vehicle identification information.

17. The charging system of claim 11, wherein each of the plurality of power charging cabinets includes a master controller, and a communication hub, the master controller being configured to communicate with the communication hub and the communication hub being configured to receive vehicle identification information relating to a vehicle coupled to a power dispenser and the power dispensers providing power dispenser identification to the communication hub.

18. The charging system of claim 11, wherein each of the plurality of power charging cabinets includes a communications hub and the communications hub communicates with a scheduling server, the scheduling server being configured to schedule charging of the vehicle.

19. The charging system of claim 11, wherein each of the plurality of power charging cabinets includes a communications hub and the communications hub communicates with a diagnostic server, the diagnostics server configured to identify diagnostics of any of vehicles, power charging cabinets, and power dispensers.

20. A method of providing charging power to a vehicle, comprising:
- receiving, by a first controller of a first power dispenser and a second controller of a second power dispenser, each power dispenser being part of a power dispenser chain, control signals from a master controller comprising a first control signal to charge a first vehicle coupled to a first power dispenser DC electrical power output of a first power dispenser;
- supplying power to a direct current (DC) electrical power input of the first power dispenser;
- responsive to the control signals, opening a first switch from the DC electrical power input of the first power dispenser to a pass-through DC electrical power output of the first power dispenser;
- responsive to the control signals, closing a second switch from the DC electrical power input of the first power dispenser to a first dispenser DC electrical power output;
- providing DC electrical power to the first vehicle through the first dispenser DC electrical power output,
- responsive to the control signals, closing the first switch from the DC electrical power input of the first power dispenser to the pass-through DC electrical power output of the first power dispenser;
- responsive to the control signals, opening the second switch from the DC electrical power input of the first power dispenser to the first dispenser DC electrical power output; and
- providing the DC electrical power to a second vehicle through the second power dispenser of the power dispenser chain, through the first power dispenser.

* * * * *